(12) United States Patent
Le Dren et al.

(10) Patent No.: US 10,215,275 B2
(45) Date of Patent: Feb. 26, 2019

(54) HYDRAULIC CIRCUIT INCLUDING A HYDRAULIC MACHINE DRAIN PROVIDED WITH A FLOW-CONTROL MEANS AND FLUID-TREATMENT FUNCTIONS

(71) Applicant: TECHNOBOOST, Paris (FR)

(72) Inventors: Arnaud Le Dren, Brunoy (FR); Andres Yarce, Nanterre (FR)

(73) Assignee: TECHNOBOOST, Paris (FR)

( * ) Notice: Subject to any disclaimer, the term of this patent is extended or adjusted under 35 U.S.C. 154(b) by 22 days.

(21) Appl. No.: 15/528,439

(22) PCT Filed: Nov. 12, 2015

(86) PCT No.: PCT/FR2015/053057
§ 371 (c)(1),
(2) Date: May 19, 2017

(87) PCT Pub. No.: WO2016/087735
PCT Pub. Date: Jun. 9, 2016

(65) Prior Publication Data
US 2017/0328469 A1     Nov. 16, 2017

(30) Foreign Application Priority Data

Dec. 4, 2014    (FR) ..................... 14 61895

(51) Int. Cl.
*F16H 61/4035*    (2010.01)
*F16H 61/4096*    (2010.01)
(Continued)

(52) U.S. Cl.
CPC ..... *F16H 61/4035* (2013.01); *F16H 61/4096* (2013.01); *F16H 61/4104* (2013.01); *F16H 61/4131* (2013.01)

(58) Field of Classification Search
CPC .... F15B 1/04; F16H 61/4035; F16H 61/4131; F16H 61/4096; F16H 61/4104; Y02T 10/6208
See application file for complete search history.

(56) References Cited

U.S. PATENT DOCUMENTS

2004/0103656 A1    6/2004    Frazer et al.
2010/0097040 A1    4/2010    Boisvert et al.

FOREIGN PATENT DOCUMENTS

EP    2131073 A1    12/2009
FR    2973302 A1    10/2012

OTHER PUBLICATIONS

International Search Report corresponding to PCT/FR2015/053057, dated Mar. 2, 2016.
(Continued)

*Primary Examiner* — Michael Leslie
*Assistant Examiner* — Abiy Teka
(74) *Attorney, Agent, or Firm* — Sandberg Phoenix & von Gontard

(57) ABSTRACT

The invention relates to a hydraulic circuit provided with at least one hydraulic power machine (2, 4) connected to a low-pressure circuit (6) and to a high-pressure circuit (10) transmitting said power, wherein the machine is provided with a drain which allows internal leaks in the casing thereof to flow towards a low-pressure accumulator (8) or a vessel at atmospheric pressure, said circuit comprising an intake pipe (30) connecting the low-pressure circuit (6) to the casing of the machine, and an outlet pipe (36) forming the drain receiving the flow from the intake pipe in order to guide same towards the vessel (8), including a heat exchanger (42) and a filter (44) forming the fluid treatment
(Continued)

elements for the entire hydraulic circuit, said circuit also comprising a means for monitoring the flow (40) in the intake and outlet pipes.

13 Claims, 3 Drawing Sheets

(51) Int. Cl.
F16H 61/4104 (2010.01)
F16H 61/4131 (2010.01)

(56) References Cited

OTHER PUBLICATIONS

Written Opinion corresponding to PCT/FR2015/053057, dated Mar. 2, 2016.

HYDRAULIC CIRCUIT INCLUDING A HYDRAULIC MACHINE DRAIN PROVIDED WITH A FLOW-CONTROL MEANS AND FLUID-TREATMENT FUNCTIONS

CROSS-REFERENCE TO RELATED APPLICATIONS

This application is the US National Stage under 35 U.S.C. § 371 of International App. No. PCT/FR2015/053057 filed on Nov. 12, 2015, and which claims priority to French App. No. 1461895 filed on Dec. 4, 2014, all of which are incorporated herein by reference.

BACKGROUND

The present invention relates to a hydraulic circuit, in particular for the traction of a hybrid motor vehicle, a method for controlling this hydraulic circuit, and a hybrid motor vehicle comprising such a hydraulic circuit.

A known type of transmission for a hydraulic hybrid motor vehicle, presented in particular in document FR-A1-2973302, comprises a planetary gear train comprising three elements connected to an internal combustion engine, a hydraulic pump and a differential powering the driving wheels. The transmission receives a hydraulic machine which can be operated as a motor or a pump, and which can be connected to the differential by several gear ratios.

The hydraulic circuit comprises a low-pressure circuit and a high-pressure circuit, each of the circuits comprising a pressure accumulator for storing energy, with the low-pressure accumulator maintaining a minimum pressure threshold to avoid cavitation of the hydraulic machines. The stored pressure fluids are then returned to the high pressure circuit to apply a driving torque to the wheels. Alternatively, the low-pressure circuit may include a booster pump which maintains a minimum level of pressure.

Various operating modes are thus obtained, including traction of the vehicle only by the hydraulic machine, the internal combustion engine being stopped, and traction by the internal combustion engine which delivers a torque to the differential and to the pump providing hydraulic power. In the latter mode, a complementary torque given by the hydraulic machine can be added.

A "short ratio" mode is also obtained with the pump stopped, the internal combustion engine delivering high torque to the drive wheels by the planetary gear train forming a speed reducer, and a "long ratio" mode is obtained with the internal combustion engine delivering a weaker torque to the driving wheels by the planetary gear train which is blocked. In addition, a "braking" mode is obtained where the hydraulic machine, working as a pump, delivers a braking torque from the vehicle, by recharging the high-pressure accumulator.

In addition, hydraulic power machines generate heat during the operation produced by the internal losses, causing a heating of the fluid. A heat exchanger is generally arranged along the main flow of fluid supplying the power to the various hydraulic machines.

This arrangement requires a heat exchanger of dimensions sufficiently large to limit the pressure drop at a high flow rate, which results in a large size and mass, whereas on vehicles it is desired to reduce these parameters in order to reduce energy consumption. Moreover, the cost of this large filter is also high.

In addition, there may be a problem of internal contamination of the circuit, in particular of the hydraulic machines, coming from materials introduced into the circuit during manufacturing of the machine, or from particles generated by the wear of the internal components during operation of the machine. This contamination leads to faster aging of the devices and can cause failures.

In order to eliminate impurities from the fluid, a filter is also generally provided in the main flow of power of the hydraulic circuit, which necessarily comprises a single direction of passage of the fluid.

However, in the case of a circuit comprising hydraulic machines working in rotation in both directions, such as for the transmission of the hybrid vehicle presented by the aforementioned prior art document, the single direction of passage in the filter may require components that rectify this direction, including an arrangement of several non-return valves, which adds bulk, mass and costs.

Furthermore, the filter, generally mounted along the main flow of the hydraulic circuit, must be of a significant size in order to avoid too great a pressure drop on this flow, which can be high.

SUMMARY

The object of the present invention is to avoid in particular the noted disadvantages of the prior art.

To this end, a hydraulic circuit is proposed featuring at least one hydraulic power machine connected to a low pressure circuit and to a high pressure circuit transmitting this power, the machine being equipped with a drain which allows internal leakage in its casing to flow to a low-pressure accumulator or a reservoir at atmospheric pressure. The hydraulic circuit comprises an intake pipe connected to the machine casing and an outlet pipe forming the drain receiving the flow of the inlet pipe to the reservoir, the outlet pipe having a heat exchanger and a filter located therealong which form the fluid processing elements for the entire hydraulic circuit, this circuit further comprising means for controlling the flow rate in the intake and outlet pipes.

An advantage of this hydraulic circuit is that with the means for controlling the flow of the drain passing through the intake and outlet pipes, it is possible to impose and control a sufficient flow of fluid independent of the main flow of power, which passes through the casing of the hydraulic machine, to both cool and scavenge the interior of this machine as well as to treat the entire fluid of the hydraulic circuit, including cooling and filtration.

A drain loop is thus obtained, having a small flow rate with respect to the main power flow, performing at the same time several functions including the drainage of the internal cavities of the hydraulic machines, and the processing of the entire fluid of the hydraulic circuit, which makes it possible to arrange a minimum number of components of reduced dimensions, due to the low flow passing through them.

The hydraulic circuit can additionally comprise one or more of the following characteristics which can be combined with one another.

According to one embodiment, the low-pressure circuit comprises a low-pressure accumulator, and the flow control means comprises a motorized pump disposed on the outlet pipe, which flows into the low-pressure accumulator.

In this case, the intake pipe advantageously has an intake check valve preventing delivery to the low pressure circuit. The intake check valve may include a calibration spring.

Advantageously, the intake check valve has a closed position in both directions which can be controlled.

Advantageously, the hydraulic circuit comprises, between the hydraulic machines and the motorized pump, an outlet to the exterior closed by a valve, allowing deaeration of the fluid.

Alternatively, the hydraulic circuit may include an intermediate reservoir at atmospheric pressure, arranged between the hydraulic machine and the motorized pump.

A method is also disclosed for controlling a hydraulic circuit comprising a motorized pump as a means for controlling the flow rate of a drainage loop, which advantageously detects a clogging of the filter by measuring operating characteristics of the motorized pump.

According to another embodiment of the hydraulic circuit, the low pressure circuit comprises a reservoir at atmospheric pressure, and the flow control means comprises a controlled valve disposed on the inlet duct.

Advantageously, the controlled valve comprises a free passage position and a position equipped with a check valve blocking the passage to the hydraulic machines.

Advantageously, the outlet pipe comprises an outlet check valve arranged at the outlet of the hydraulic machines, which blocks a return to these machines.

The hydraulic circuit may in particular comprise several hydraulic machines, each fed by an independent intake pipe coming directly from the low pressure circuit.

The invention further relates to a hybrid motor vehicle having a drivetrain using hydraulic power, wherein the vehicle comprises a hydraulic circuit comprising of any of the foregoing features.

DESCRIPTION OF THE FIGURES

The invention will be better understood and other characteristics and advantages will appear more clearly upon reading the description given below by way of example, with reference to the accompanying drawings, in which.

DETAILED DESCRIPTION

Generally speaking, power hydraulic machines comprise, in a known manner, a drain connected to the casing in a low-pressure zone, which makes it possible to recover a leakage flow coming in particular from the high pressure zone, in order to discharge the leakage flow to a reservoir having a lower pressure. Generally, the drain has a variable flow rate of fluid which is uncontrolled, and which, in particular, is dependent on the pressure difference generating the internal leaks.

Figure 1:
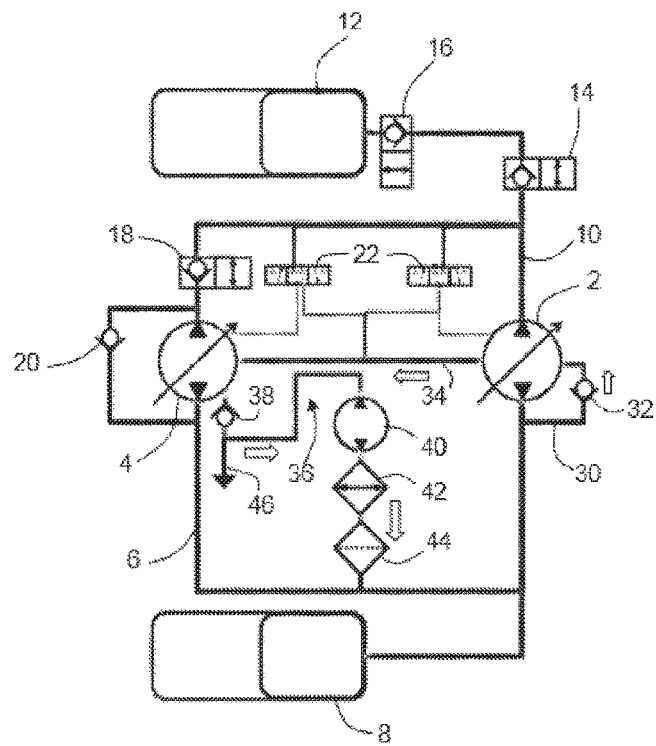
FIGS. 1 to 4 show a hydraulic circuit comprising two hydraulic machines equipped with drains mounted in series.

FIG. 1 shows a hydraulic circuit of a hybrid vehicle comprising a first hydraulic machine 2 and a second hydraulic machine 4 connected to a transmission of the vehicle, which are connected to a same low pressure circuit 6 which comprises a low pressure accumulator 8.

In particular for the usual modes of operation of the hybrid vehicle, the first hydraulic machine 2 operates as a motor, and the second hydraulic machine 4 operates as a pump, with this first hydraulic machine receiving the pressurized fluid from the high pressure reservoir 12 or directly from the second hydraulic machine. For particular modes, however, such as vehicle braking or maximum acceleration, these two hydraulic machines 2, 4 can also operate in reverse.

The first hydraulic machine 2 is connected directly to a high-pressure circuit 10, which feeds a high-pressure accumulator 12 via two valves 14, 16 arranged in series, each of the valves comprising, in one position, a check valve mounted in opposition, one with respect to the other, making it possible to control the intake and outlet flow rates in this high-pressure accumulator, and to ensure safety.

The second hydraulic machine 4 is connected to the high-pressure circuit 10 by means of a valve 18, comprising in one position a check valve allowing only a passage to this high-pressure circuit. A bypass check valve 20 is arranged in parallel with the second hydraulic machine 4 to permit a free passage of the fluid to the high pressure circuit 10.

The hydraulic circuit comprises two solenoid valves 22 receiving the fluid from the high-pressure circuit 10, each supplying control of one of the hydraulic machines 2, 4.

The low-pressure circuit 6 comprises a power supply conduit 30 feeding the casing of the first hydraulic machine 2, and comprises an intake check valve 32 which prevents a return of fluid to this low-pressure circuit.

An intermediate conduit 34 then connects the casings of the two hydraulic machines to power the second hydraulic machine 4 from the first hydraulic machine 2, the conduit 34 receiving the flow of the power supply conduit 30.

Optionally, the intake check valve 32 may have a calibration spring which imposes a pressure drop going out of this valve in order to ensure a drain pressure in the casings of the hydraulic machines 2, 4, which is less than the pressure in the low-pressure circuit 6.

An outlet pipe 36 receives the flow passing through the casing of the second hydraulic machine 4, in order to pass the flow successively through an outlet check valve 38, allowing only a passage of the flow in this direction, and then by an electric motorized pump 40, which pushes this flow successively into a heat exchanger 42, and then into a filter 44, opening into the low pressure circuit 6, in order to close a drain loop indicated by the arrows for circulating the fluid.

The outlet check valve 38 makes it possible to protect the integrity of the hydraulic machines 2, 4, thereby avoiding a discharge of fluid coming from the drain to the casing of these machines.

In particular in the event of an incident on the fluid handling system caused, for example, by an accident of the vehicle in which the heat exchanger arranged at the front of this vehicle and next to the radiator of the internal combustion engine is pierced, a rise of fluid which can contain particles towards the hydraulic machines is avoided. This helps protect the hydraulic machines, which are fragile and expensive components.

The heat exchanger 42 can, in particular, transmit its heat to a cooling water circuit or to an external air flow. It will be noted that the drain loop begins with the first hydraulic machine 2 generally operating as a motor, and which can heat up more than the second hydraulic machine 4, which promotes its cooling.

The motorized pump 40 constitutes a flow control means forming a scavenging in the casing of the two hydraulic machines 2, 4, which fulfills the drainage function of these casings, as well as cooling the internal parts, and rinsing these parts to take away impurities which would be inside.

The motorized pump 40 must overcome the pressure drops from the passage of the casings of the hydraulic machines 2, 4 and the fluid processing elements in order to carry out the circulation.

By adjusting the speed of the motorized pump 40, the flow rate, which is the same in the two casings, can be adjusted as a function of the temperature of the hydraulic machines 2, 4, which can be measured directly or estimated according to the operating characteristics of this pump, and, in particular according to the flow rate and the pressure of the pump, resulting in a sort of heating up, in order to regulate this temperature of the hydraulic machines.

It will be noted that the flow rate of the drain loop passes in the same direction in the filter 44, without using any component to rectify this flow.

It will also be noted that this flow rate is low with respect to the main flow passing through the hydraulic machines 2, 4 and delivering the power. The heat exchanger 42 and the filter 44 operate with a controlled flow controlled by the motorized pump 40, which is reduced with respect to the main flow, which makes it possible, with smaller processing elements, to reduce the power losses in this processing of the fluid with respect to a processing of the main flow.

It is possible to provide, in particular, for an application on a hybrid vehicle presented by the document of the prior art, a hydraulic circuit comprising a main flow rate in the hydraulic machines which is of the order of 100 l/mn, a flow rate of the drain loop on the order of 10 l/mn. The leakage in this drain loop is thus optimized in accordance with its own requirements.

In particular, the motorized pump 40 can be used to detect a clogging of the filter 44, by measuring its consumed power or its output pressure, which then makes it possible to avoid the installation of a by-pass valve in parallel with this filter.

In addition, along with the input to the motorized pump 40 forming a point of the low-pressure circuit, there is provided an outlet to the exterior closed by a purging means 46, forming a closing device which allows for deaeration and purging of the fluid passing through the drain loop.

Advantageously, a purging means 46, comprising a float detecting the presence of air, is used, and the movement of this float caused by the presence of air automatically opens the outlet of the purging means to let out this air.

It is also possible to carry out by this same purging means 46 a filling of the circuit facilitated by the low pressure in this area.

Optionally, the intake check valve 32 may comprise a control, allowing the passage of the intake pipe 30 to be completely closed. By activating the motorized pump 40, a strong vacuum is generated upstream of this pump, which facilitates the degassing of the fluid in this zone and its evacuation by the purging means 46.

Moreover, the vacuum upstream of the motorized pump 40 can cause a partial vacuum of the casings of the hydraulic machines 2, 4, which limits the agitation of the fluid contained therein and improves the efficiency.

In addition, a supplementary check valve, arranged in parallel with the pump 40, may be provided for bypassing or "shunting" the motorized pump 40. Such a supplementary check valve forms a free passage from the upstream to the downstream, which nevertheless gives a flow in the drain loop with the pump stopped, if the pressure difference naturally allows it.

A similar operation of this circuit is obtained with a free fluid passage to the parallel outlet of the motorized pump 40 if, for example, the casings of the hydraulic machines 2, 4 generate a greater flow rate than that absorbed by this pump.

Figure 2:
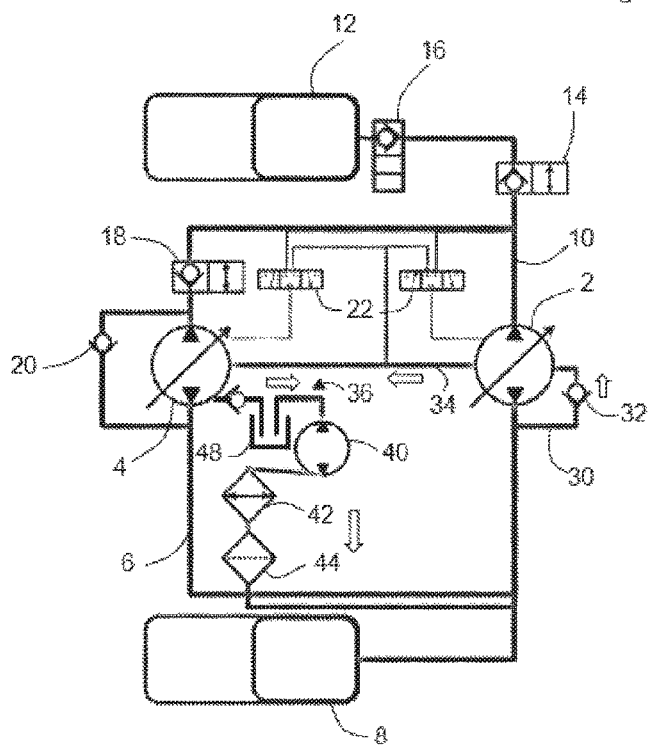

FIG. 2 shows a similar hydraulic circuit comprising a small intermediate reservoir 48 at atmospheric pressure, disposed at the outlet of the second hydraulic machine 4 after the outlet check valve 38.

The motorized pump 40 then draws the fluid into the intermediate reservoir 48, in order to make it pass through the heat exchanger 42 and the filter 44, and to obtain, upon exiting, a sufficient pressure, making it possible to recharge the low-pressure accumulator 8.

Figure 3:
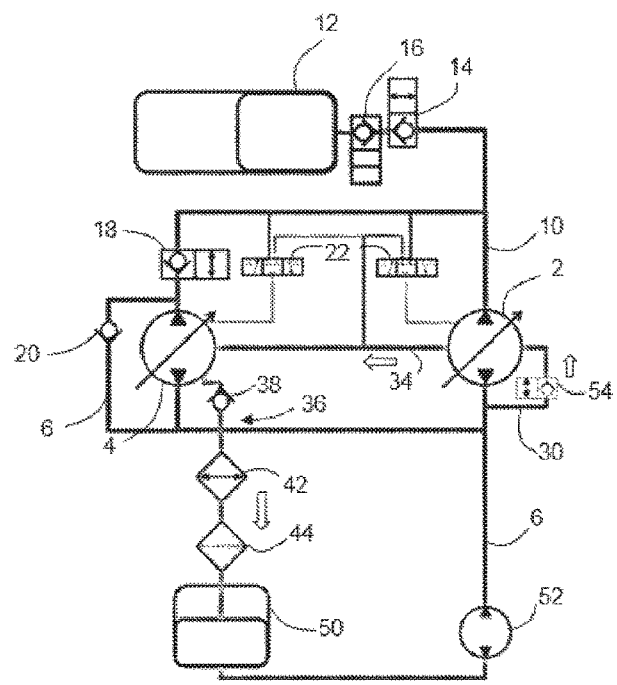

FIG. 3 shows a hydraulic circuit comprising a low-pressure circuit with no low-pressure accumulator, and with an outlet of the drain loop opening into a reservoir 50 which is at atmospheric pressure. A booster pump 52 draws the fluid from this reservoir 50 in order to supply the low-pressure circuit 6, by generating the pressure sufficient for this purpose.

The intake pipe 30 of the drain loop comprises a controlled inlet valve 54, comprising in a first position a free passage in both directions, and in a second position a check valve allowing a free passage of the flow coming from the casing of the first hydraulic machine 2 towards the low pressure circuit 6 upstream, in order to avoid an overpressure in the casing of the first hydraulic machine.

The controlled intake valve 54 controlling the flow rate of the drain loop may be a solenoid valve operating as all-or-nothing, possibly leaking when closed to allow a minimum flow. Alternatively, the controlled intake valve 54 may be a proportional solenoid valve. It is also possible to use a mechanical regulator of the cut-out type, which operates automatically by pressure differential.

The outlet pipe 36 coming from the second hydraulic machine 4 comprises successively in series the outlet check valve 38, the heat exchanger 42 and the filter 44. There is no motorized pump on this outlet pipe 36.

A natural flow is obtained in the drain loop using the pressure generated by the booster pump 52 in the low pressure circuit 6, which is controlled by the controlled valve 54 oscillating between its two positions.

It will be noted that for this hydraulic circuit, the deaeration and the purging of the fluid are performed automatically by the passage of this fluid leaving the drain loop in the reservoir 50 at atmospheric pressure.

Figure 4:
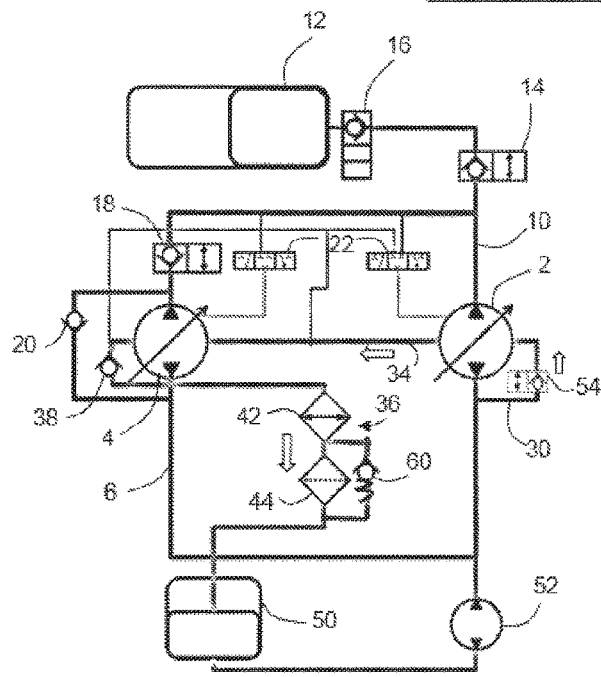

FIG. 4 shows a hydraulic circuit equipped with a reservoir 50 at atmospheric pressure, and comprising a by-pass valve 60 on the outlet pipe 36 of the drain loop. The by-pass valve 60 is in parallel with the filter 44, and is equipped with a calibration spring.

In the case where the filter 44 clogs and where there is a pressure difference at the intake of this filter higher than the calibration pressure of the by-pass valve 60, the bypass valve 60 forms an automatic passage of the fluid from the drain loop around the filter.

Figure 5:
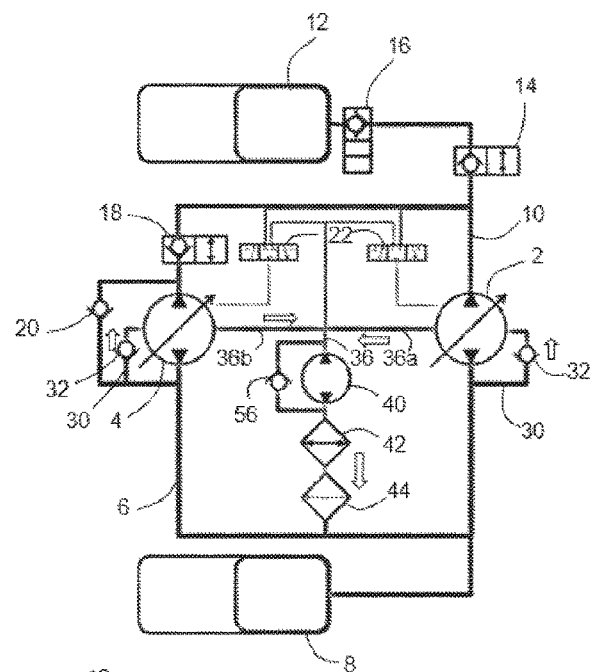
FIGS. 5 and 6 show variants of a hydraulic circuit comprising two hydraulic machines equipped with drains mounted in parallel.

FIG. 5 shows a hydraulic circuit equipped with a low-pressure accumulator 8 on the low-pressure circuit 6, comprising for each hydraulic machine 2, 4 a particular intake pipe 30, each intake pipe comprising an intake check valve 32, which individually feeds its casing from the low pressure circuit 6.

The two outlet pipes 36a, 36b that are specific to each hydraulic machine 2, 4, meet in a single outlet pipe 36 comprising, successively, the motorized pump 40, equipped with an additional bypass valve 56 disposed in parallel with this pump, and then the heat exchanger 42, and the filter 44. In this circuit there is no outlet check valve, which can be included if desired.

For each hydraulic machine 2, 4, a supply from the casing coming from the low pressure circuit 6 is obtained, which gives the hydraulic machines a flow coming directly from the fluid treatment elements. The same quality of temperature and purity of the fluid supplying these machines is then obtained.

Figure 6:
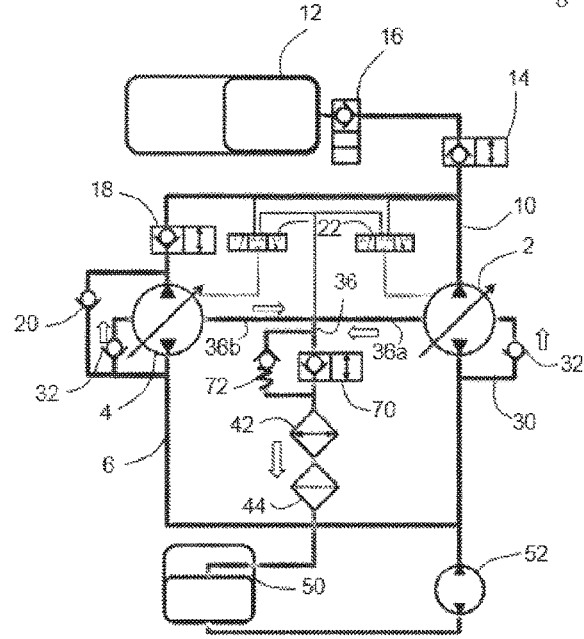

FIG. 6 shows a hydraulic circuit equipped with a reservoir 50 at atmospheric pressure, comprising for each hydraulic machine 2, 4 a particular intake pipe 30.

The single outlet pipe 36 receiving in parallel the fluid of the two machines 2, 4, comprises a controlled outlet valve 70, comprising in a first position a free passage in both directions, and in a second position a check valve allowing a free passage of the flow towards the upstream of the drain loop, in order to avoid an overpressure at the outlet.

This controlled outlet valve 70 may include the various features presented for the controlled intake valve 54, disposed at the intake of the drain loop 30 to the hydraulic circuit of FIG. 3. It works in the same way in order to regulate the flow of this drain loop.

A calibrated bypass check valve 72, disposed in parallel with the controlled outlet valve 70, comprises a calibration spring allowing fluid to flow from upstream to downstream from a pressure difference threshold.

Alternatively, it is possible to place on each outlet pipe 36a, 36b coming from a hydraulic machine 2, 4, an individual controlled outlet valve here driving the fluid towards the heat exchanger 42 and filter 44 which are shared for these two machines. It is thus possible with each individual controlled outlet valve to adjust the flow rate of the drain loop individually for each hydraulic machine 2, 4, according to its particular requirements.

As a general rule, a drain loop is thus arranged independent of the main flow transmitting the power through the hydraulic machines 2, 4, comprising in each case a flow control means for optimizing its flow as a function of the operating conditions of these machines. It is possible to optimize this flow rate, which ensures both good working conditions of the machines guaranteeing their lifetimes and a minimum consumption of energy.

In general, the hydraulic circuit according to the invention can be used with different types of transmissions, the transmission presented in the document of the prior art cited above being given only by way of example of use of this hydraulic circuit.

The invention claimed is:

1. A hydraulic circuit having at least one hydraulic power machine connected to a low-pressure circuit and to a high-pressure circuit transmitting hydraulic power, the at least one hydraulic machine having a casing and being equipped with a drain which allows an internal leakage in said casing to flow to a low pressure accumulator or a reservoir at atmospheric pressure, said hydraulic circuit comprising an intake pipe connecting the low pressure circuit to the casing of said at least one hydraulic machine and an outlet pipe forming the drain receiving the flow of the intake pipe to conduct the flow to the low pressure accumulator or the reservoir at atmospheric pressure, the drain comprising a heat exchanger and a filter which define fluid processing elements for the entire hydraulic circuit, the hydraulic circuit further comprising a flow control means in the intake and outlet pipes, the low pressure circuit comprising said low pressure accumulator, said flow control means comprising a motorized pump arranged along the outlet pipe which discharges into the low pressure accumulator.

2. The hydraulic circuit according to claim 1, wherein the intake pipe has an intake check valve which prevents backflow to the low pressure circuit.

3. The hydraulic circuit according to claim 2, wherein the intake check valve has a closed position in both directions, which can be controlled.

4. The hydraulic circuit according to claim 1 wherein, the hydraulic circuit comprises an outlet to the exterior between the at least one hydraulic machine and the motorized pump, the outlet comprising a closure device allowing for deaeration of the fluid.

5. The hydraulic circuit according to claim 1, wherein the hydraulic circuit comprises an intermediate reservoir disposed between the at least one hydraulic machine and the motorized pump, said intermediate reservoir being at atmospheric pressure.

6. A method for controlling a hydraulic circuit according to claim 1, the method comprising detecting clogging of the filter by measuring a selected operating characteristic of the motorized pump.

7. A hydraulic circuit featuring at least one hydraulic power machine connected to a low pressure circuit and a high pressure circuit transmitting hydraulic power, the at least one hydraulic machine having a casing and being equipped with a drain which allows an internal leakage flow in said casing to a low-pressure accumulator or a reservoir at atmospheric pressure, said hydraulic circuit comprising an intake pipe connecting the low pressure circuit to the casing of said at least one hydraulic machine and an outlet pipe forming the drain receiving the flow of the intake pipe and leading the flow to the low-pressure accumulator or the reservoir at atmospheric pressure, the drain comprising a heat exchanger and a filter which define fluid processing elements for the entire hydraulic circuit, said hydraulic circuit further comprising a flow control means in the intake and outlet pipes, the low pressure circuit comprising said reservoir at atmospheric pressure, said flow control means comprising a controlled valve disposed on the intake pipe.

8. The hydraulic circuit according to claim 7, wherein the controlled valve comprises a first position defining a free passage and a second position equipped with a check valve blocking the passage towards the at least one hydraulic machine.

9. The hydraulic circuit according to claim 1, wherein the outlet pipe comprises an outlet check valve arranged at the outlet of the at least one hydraulic machine which blocks a return to the at least one hydraulic machine.

10. The hydraulic circuit according to claim 1, wherein the at least one hydraulic machine comprises at least two hydraulic machines, each hydraulic machine being supplied by an independent intake pipe coming directly from the low pressure circuit.

11. A hybrid motor vehicle having a drivetrain using hydraulic energy, wherein the hybrid motor vehicle comprises the hydraulic circuit made according to claim 1.

12. The hydraulic circuit of according to claim 2, wherein said intake check valve includes a calibration spring.

13. The hydraulic circuit of according to claim 3, wherein the closed position of the intake check valve is controlled.

* * * * *